US006604744B2

(12) United States Patent
Monge

(10) Patent No.: US 6,604,744 B2
(45) Date of Patent: Aug. 12, 2003

(54) RAPID LOAD DRILL BIT ADAPTER

(75) Inventor: Valery Monge, Yorba Linda, CA (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/760,868

(22) Filed: Jan. 16, 2001

(65) Prior Publication Data

US 2002/0093151 A1 Jul. 18, 2002

(51) Int. Cl.[7] .......................... B23B 31/02; B25B 23/00

(52) U.S. Cl. ............................. 279/79; 279/84; 279/89; 279/145

(58) Field of Search ............................. 279/79, 80, 84, 279/23.1, 29, 89, 145; 408/226, 239 R, 239 A; 82/160; 81/438, 439

(56) References Cited

U.S. PATENT DOCUMENTS

| | | | | | |
|---|---|---|---|---|---|
| 917,087 | A | * | 4/1909 | Lovenich | 279/158 |
| 2,987,334 | A | * | 6/1961 | Wendling | 287/119 |
| 3,715,168 | A | * | 2/1973 | Kuhn | 408/239 |
| 4,306,823 | A | | 12/1981 | Nashlund | |
| 4,588,335 | A | * | 5/1986 | Pearson, Jr. | 279/76 |
| 5,046,901 | A | | 9/1991 | Taylor | |
| 5,219,250 | A | * | 6/1993 | Voorhees | 407/34 |
| 5,222,845 | A | | 6/1993 | Goldstein et al. | |
| 5,234,296 | A | * | 8/1993 | Presby et al. | 409/234 |
| 5,316,323 | A | * | 5/1994 | Jovanovic | 279/22 |
| 5,897,121 | A | * | 4/1999 | Case | 279/145 |
| 6,038,946 | A | * | 3/2000 | Jackson et al. | 81/177.2 |
| 6,145,851 | A | * | 11/2000 | Heber | 279/143 |
| 6,223,633 | B1 | * | 5/2001 | Chien-Chich | 81/438 |
| 6,350,087 | B1 | * | 2/2002 | Berry et al. | 144/154.5 |

* cited by examiner

*Primary Examiner*—Henry W. H. Tsai
(74) *Attorney, Agent, or Firm*—Richard J. Veltman; John D. Del Ponti

(57) ABSTRACT

A novel drill bit adapter includes a body portion, a cap portion, a spring-biased catch and a push button actuator. The cap portion includes a transverse aperture and cooperates with the body to define a longitudinal aperture and a catch-receiving cavity. The push button is disposed in the transverse aperture and engages the catch to move the catch in the cavity relative to the longitudinal aperture in opposition to a biasing force supplied by the spring. The spring is a wire spring that extends longitudinally from the body portion into the cap portion to engage the catch.

16 Claims, 7 Drawing Sheets

RAPID LOAD DRILL BIT ADAPTER

The present invention relates generally to drill bit adapters for coupling drill bits to a drill, and particularly to rapid load drill bit adapters that do not require the use of a chuck key for operation.

BACKGROUND OF THE INVENTION

Installation jigs for installing locksets are known in the art. For example, U.S. Pat. No. 5,915,891 to Fridman, U.S. Pat. No. 5,762,115 to Shouse, U.S. Pat. No. 5,222,845 to Goldstein et al., and U.S. Pat. No. 5,116,170 to Palmer et al. all relate to installation jigs. U.S. Pat. No. 5,915,891 to Fridman relates to a drill guide and method for installing a door lock. However, Fridman's drill guide is limited to drilling transverse holes and does not provide for drilling a latch hole in the edge of the door. Moreover, Fridman's drill guide must be held in position manually or the installer must carry a clamp for the purpose. Unfortunately, a clamp is both inconvenient to carry and awkward to use while trying to hold the guide in the proper position. U.S. Pat. No. 5,762,115 to Shouse relates to a door template for use with a drill and a router. Shouse's template is limited to routing out a recess for receiving the edge plate of a latch. In addition, Shouse's guide must be held in place manually or the installer must use a clamp. U.S. Pat. No. 5,222,845 to Goldstein et al. relates to an adjustable drill guide for door handles and locks. Unfortunately, the guide holes for drilling the latch hole in the door edge can only accommodate a door having a particular thickness, and a second drill guide must be used for a second door having a different thickness. In addition, the drill guide uses interchangeable plates to provide guide holes for the transverse holes. If different backsets are required, the installer must partially disassemble the drill guide and reassemble the guide with a different plate. U.S. Pat. No. 5,116,170 to Palmer et al. relates to a drill jig for preparing a door to receive a cylindrical lock. However, Palmer's jig is only useful for drilling holes to accommodate through-bolts to retain a lockset in place. Moreover, a transverse hole must first be bored in the door, presumably using another jig, before Palmer's drill jig can be used.

To overcome the above-recited deficiencies, self-clamping jigs for drilling both transverse holes and latch holes have been developed. For example, U.S. Pat. No. 4,715,125 to Livick relates to a door lock drilling template and includes drill guides both for a transverse hole and a latch hole. Unfortunately, there is no provision for adjusting the position of the latch hole drill guide to accommodate doors with different thicknesses. Livick's template is configured to accommodate a 1¾-inch thick door and requires a shim to accommodate a standard 1⅜-inch thick residential interior door. In addition, although the transverse hole drill guides can be moved to accommodate various backsets, to do so the guides must be removed from the template, repositioned, and reassembled on the template, which is inconvenient and provides an opportunity to misalign the guides.

U.S. Pat. No. 4,331,411 to Kessinger et al. relates to a door lock drill assembly. Kessinger et al. disclose drill guides for both transverse holes and latch holes but is designed for use on a conventional exterior door. The '411 patent does not disclose any adjustment mechanism for accommodating doors with different thicknesses. In order to accommodate a standard interior door, which is thinner than an exterior door, an adapter must be installed on the assembly to properly align the latch guide. It is inconvenient to carry an adapter, which can be lost or misplaced.

U.S. Pat. No. 4,306,823 to Nashlund relates to a boring and routing jig for cylindrical door knob assemblies. Nashlund does not disclose any provision for changing the backset. Instead, Nashlund discloses changeable templates, which are subject to possible improper installation and misalignment. Moreover, the method of aligning the latch guide is inaccurate and cumbersome, requiring multiple adjustments of a pair of C-clamps.

U.S. Pat. No. 4,248,554 to Boucher et al. relates to a door boring jig system. The disclosed jig includes a cumbersome backset adjustment mechanism that requires an installer to align a small hole with a pin on each of two backset adjusting units.

U.S. Pat. No. 3,302,674 to Russell et al. relates to a unit lock installation jig. The '674 patent allows for marking the proper position for the latch hole, but does not provide a latch guide for drilling the hole. Moreover, the '674 patent only provides for a single backset.

U.S. Pat. No. 2,763,299 Cerf relates to a lock installation tool. Unfortunately, Cerf's tool only provides for a single backset.

U.S. Pat. No. 2,679,771 to Schlage relates to a boring jig for doors. Schlage discloses for accurately marking a door for boring holes to install a lock, but does not include drill guides to ensure that the holes are drilled properly.

None of the above-cited patents provides an installation jig with the advantageous combination of quick and easy backset adjustment, automatic centering of a latch guide, multiple in-line arms to permit standard door prep on metal doors as well as wood doors, and the capability of performing standard 1½ inch door preps and 2⅛ inch door preps.

Another problem with conventional installation of locksets is the need to use different drill bits and hole saws to bore the transverse hole and the latch hole. When the installer is finished using the hole saw to drill the transverse hole, he must disconnect the hole saw from the drill and connect the appropriate drill bit to bore the latch hole. This can be tedious and awkward using conventional key operated chucks associated with many drills.

One approach to overcome this problem is the use of rapid load chucks. With a rapid load chuck, the user grasps the chuck and operates the drill in a reverse direction to open the chuck. After inserting a drill bit in the chuck, the user grasps the chuck and operates the drill in a forward direction to lock the chuck onto the drill bit. Unfortunately, it is inconvenient and awkward to change the direction of the drill each time the drill bit needs to be changed.

To overcome this problem, users have coupled rapid load drill bit adapters to the drill. With the adapter, the user only cycles the drill once to install the adapter, and then inserts the drill bits into the adapter. For example, U.S. Pat. No. 4,588,335 to Pearson discloses a quick change tool retention device for power operated mechanism. The disclosed device includes a blind cavity in a body portion with a four-member box-like structure disposed in the cavity. The box-like structure includes a pair of transverse members and a pair of longitudinal members. One of the transverse members is received by a push button and transfers movement of the push button to the pair of longitudinal members. The longitudinal members pass through the second transverse member and a pair of springs engage the longitudinal members to oppose movement of the push button and urge the second transverse member into engagement with the shank of a drill bit to retain the drill bit in the device. Pearson's device was not commercially successful, probably because of the complex manufacturing necessary to produce it and/or the large number of parts required. A rapid load adapter that was easier to manufacture and required fewer parts would be welcome by manufacturers.

SUMMARY OF THE INVENTION

The present invention overcomes the above-noted deficiencies and others in conventional drill bit adapters by providing a novel drill bit adapter including a body portion, a cap portion, a spring-biased catch and a push button actuator. The cap portion includes a transverse aperture and cooperates with the body to define a longitudinal aperture and a catch-receiving cavity. The push button is disposed in the transverse aperture and engages the catch to move the catch in the cavity relative to the longitudinal aperture in opposition to a biasing force supplied by the spring. The spring is a wire spring that extends longitudinally from the body portion into the cap portion to engage the catch.

Other features and advantages of the invention will become apparent from the following portion of this specification and from the accompanying drawings which illustrate a presently preferred embodiment incorporating the principles of the invention.

DETAILED DESCRIPTION OF THE DRAWINGS

Figure 1:
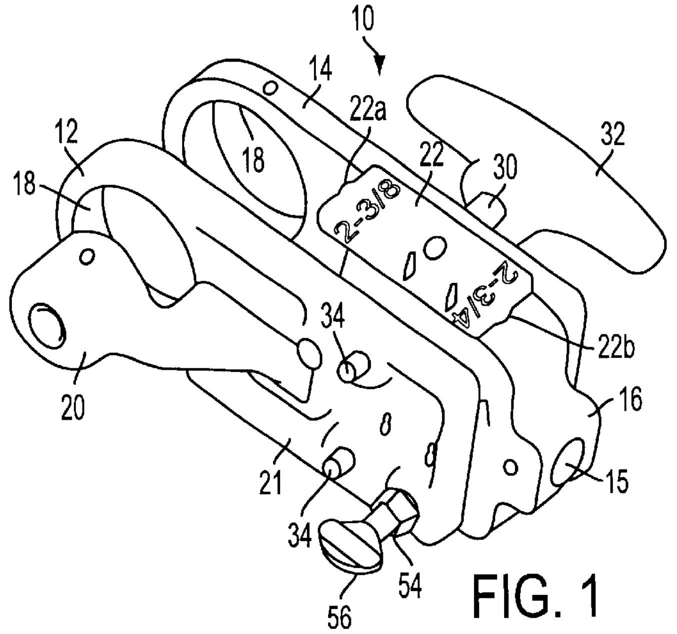
FIG. 1 is a perspective view of an installation jig according to the present invention.
Figure 2:
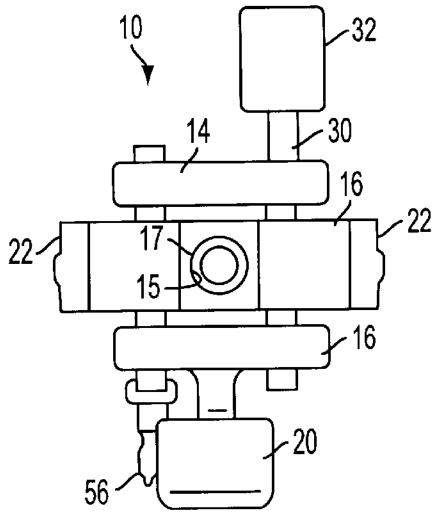
FIG. 2 is an end view of the jig illustrated in FIG. 1.
Figure 3:
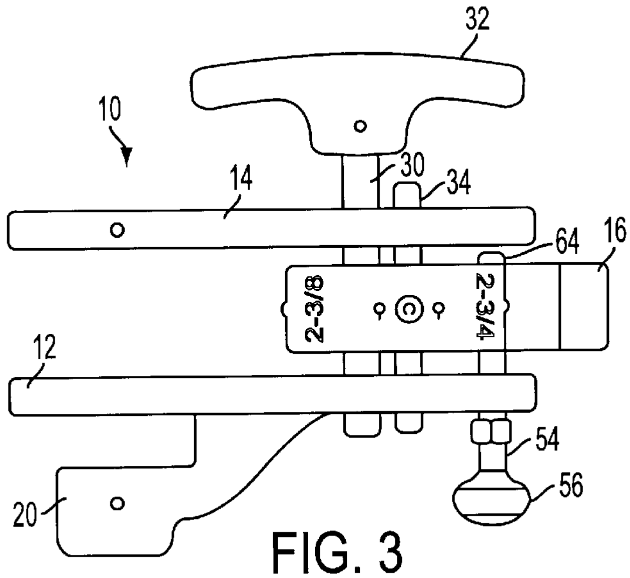
FIG. 3 is a top view of the jig illustrated in FIG. 1.
Figure 4:
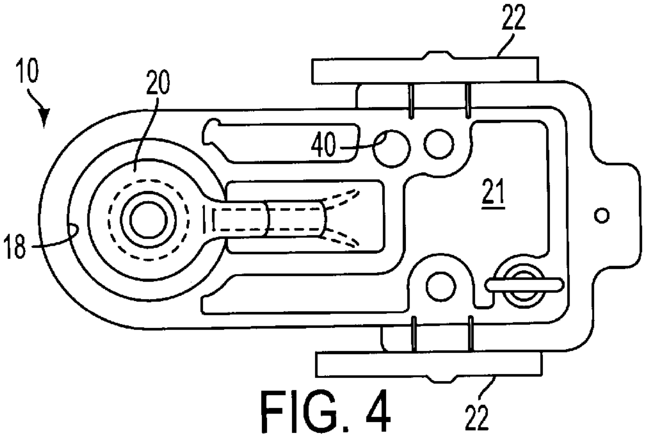
FIG. 4 is a side view of the jig illustrated in FIG. 1.

A lockset installation jig 10 is illustrated in FIGS. 1–5. The jig 10 includes a first jaw 12, a second jaw 14, and a latch guide 16 disposed between the jaws 12, 14. The jaws 12, 14 and the latch guide 16 cooperate to define a generally U-shaped clamp for attachment to a door (not shown). Each of the jaws 12, 14 includes a hole saw-receiving aperture 18. The latch guide 16 includes a drill-receiving bore 15 with a bushing 17. An in-line arm 20 is attached to the first jaw 12 and extends outwardly from the outer surface 21 of the jaw 12. Upper and lower backset spacers 22 are rotatably coupled to the latch guide 16 and each backset spacer 22 includes indicia to indicate the amount of backset to be applied. An adjustment mechanism couples the jaws 12, 14 to the latch guide 16 for opening and closing movement of the jaws 12, 14 to clamp the installation jig 10 to a door (not shown).

The adjustment mechanism includes a threaded shaft 30, a handle 32 coupled to the threaded shaft 30, and a pair of smooth guide pins 34. The threaded shaft 30 and the guide pins 34 extend through the jaws 12, 14 and the latch guide 16. The threaded shaft 30 includes a first portion 36 with right-handed threads for engaging a threaded aperture 40 in the first jaw 12 and a second portion 37 with left-handed threads for engaging a threaded aperture 42 in the second jaw 14. A center, unthreaded portion 42 includes an annular groove 44 and is disposed in an unthreaded aperture 46 in the latch guide 16. A retaining pin 45 extends into the latch guide 16 to intersect the groove 44 to allow rotation of the shaft 30 while laterally retaining the shaft 30 in the latch guide 16. The guide pins 34 are disposed in unthreaded apertures 50 formed in the first and second jaws 12, 14 and the latch guide 16. An adjuster screw 54 has a turnpiece 56 at a proximal end 60 and engages a threaded aperture 62 in the first jaw 12. The distal end 64 extends through an unthreaded aperture 60 in the latch guide 16 and abuts the second jaw 14 when the jaws 12, 14 are parallel to each other. A locking nut 66 is disposed on the screw 54 between the turnpiece 56 and the first jaw 12.

To adjust the installation jig 10, the installer turns the handle 32 in a first direction, thereby turning the threaded shaft 30. The threaded shaft 30 pulls the jaws 12, 14 closer together, with the jaws 12, 14 moving along the guide pins 34. Turning the handle 32 in the opposite direction moves the jaws 12, 14 apart. The installer turns the adjusting screw 54 to align the jaws 12, 14 in a parallel relation with the faces of the door to ensure a tight clamping action without causing damage to the door. The locking nut 66 is moved along the screw 54 to set the parallel relationship of the jaws 12, 14.

Figure 5:
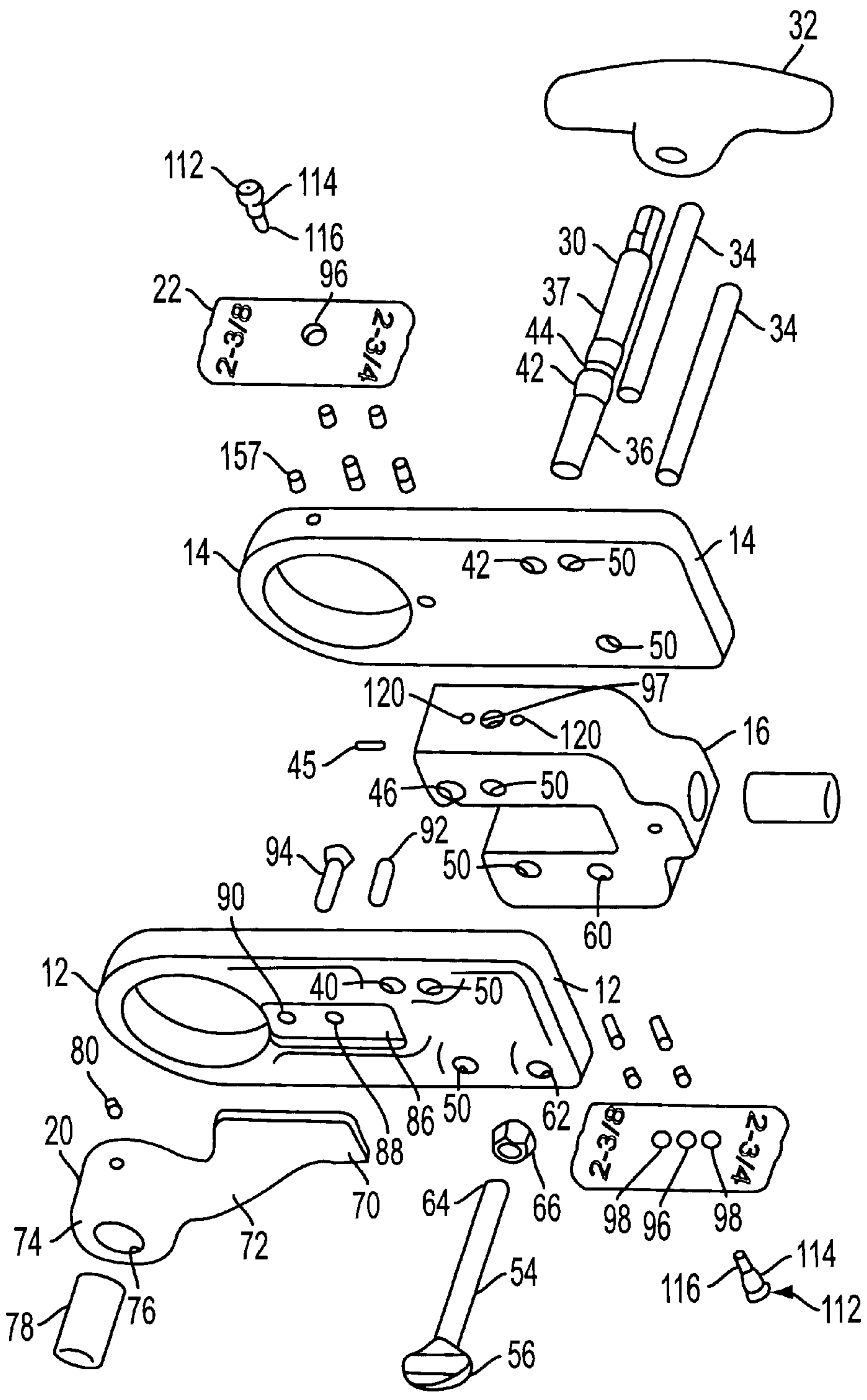
FIG. 5 is an exploded view of the jig illustrated in FIG. 1.
Figure 6:
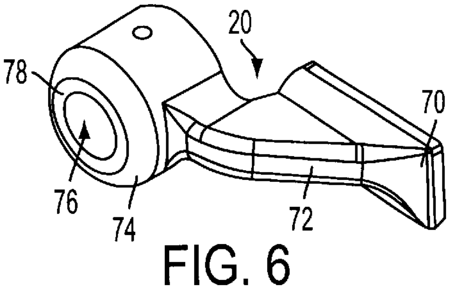
FIG. 6 is a perspective view of an in-line arm for use in the jig illustrated in FIG. 1.
Figure 7:
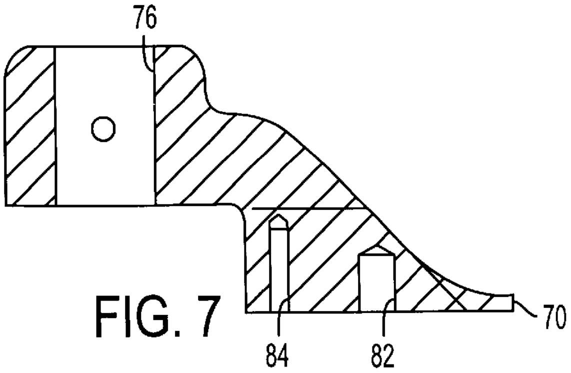
FIG. 7 is a section view through the center of the in-line arm of FIG. 6.

The in-line arm 20, illustrated in FIGS. 6–7, includes a base portion 70, a supporting arm 72 and a drill guide portion 74 having a shank bore 76 extending therethrough, with the shank bore 76 being co-axially aligned with the hole saw-receiving aperture 18. A shank bushing 78 is installed in the shank bore 76 and is held in place by set screw 80 (FIG. 5). A dowel receiving bore 82 and a threaded screw-receiving bore 84 extend from the bottom of the in-line arm 20 through the base portion 70 and into the supporting arm 72. Preferably, the first jaw 12 includes a recess 86 configured to receive the base portion 70 of the in-line arm 20 and includes a dowel-receiving bore 88 and a unthreaded screw-receiving bore 90. The dowel-receiving bore 88 and the screw-receiving bore 90 in the recess 86 are aligned with the dowel-receiving bore 82 and the threaded screw-receiving bore 84, respectively. A dowel 92 and retaining screw 94 attach the in-line arm 20 to the first jaw 12.

Figure 8:
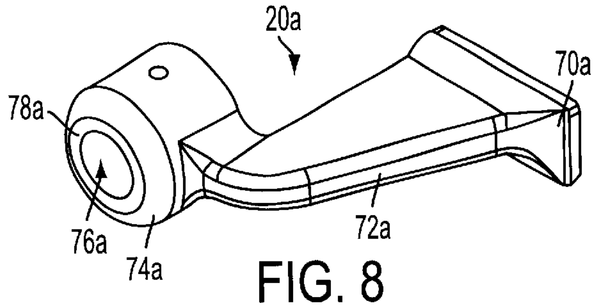
FIG. 8 is a perspective view of an alternative in-line arm for use in the jig illustrated in FIG. 1.

A second in-line arm 20*a,* illustrated in FIG. 8, is substantially similar in design to the in-line arm 20 illustrated in FIGS. 6–7, including a base portion 70*a,* and a drill guide portion 74*a* having a shank bore 76*a* extending therethrough, but includes an elongated supporting arm 72*a*. The base portion 70*a* is substantially identical to base portion 70, including a dowel-receiving bore (not shown) and threaded screw-receiving bore (not shown) configured to receive the dowel 92 and retaining screw 94, respectively, when the in-line arm 20*a* is disposed in the recess 86. The alternative in-line arm 20*a* provides a greater distance between the shank bore 76 and the door than available with the supporting arm 72. The increased distance allows for the use of a hole saw designed for use with thicker doors or metal doors.

Figure 9:
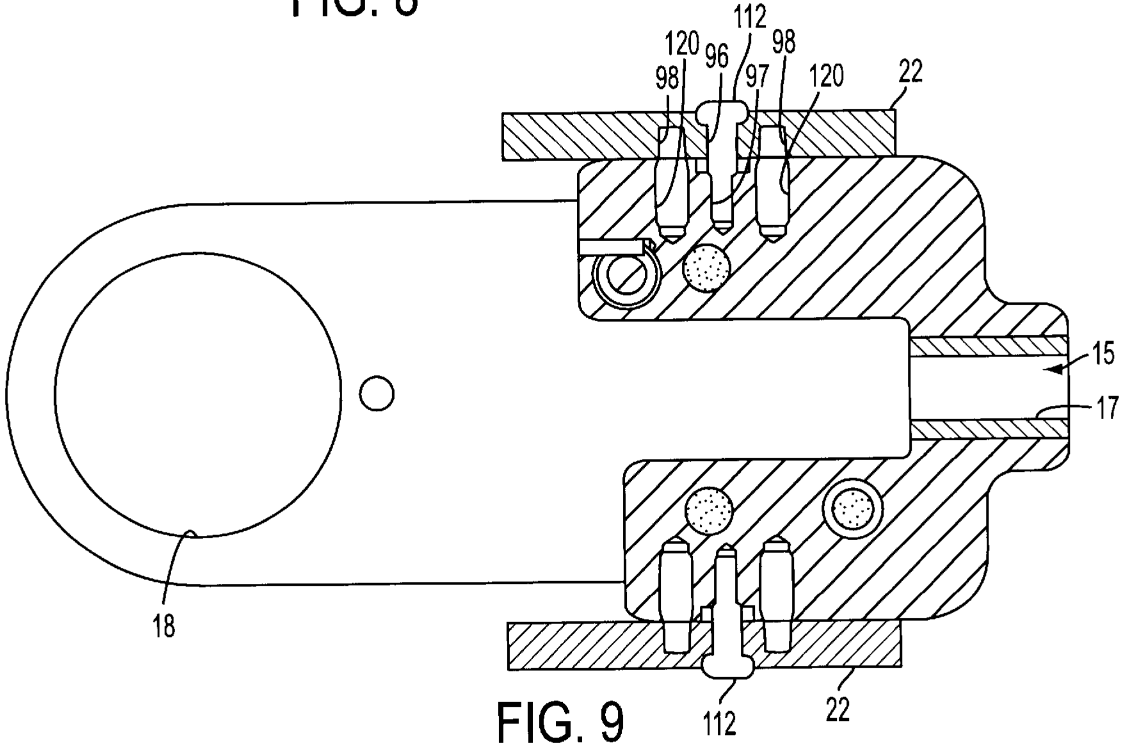
FIG. 9 is a section view taken through the latch guide and backset spacers.
Figure 10:
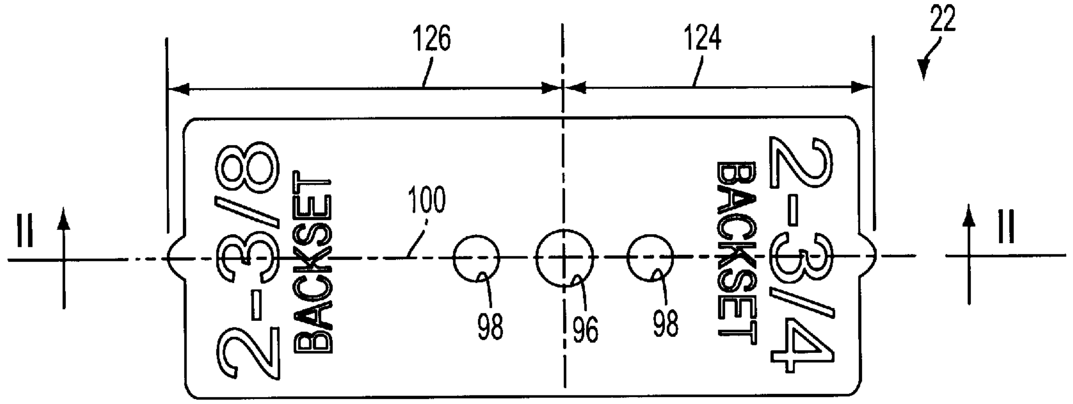
FIG. 10 is a plan view of a backset spacer.

The backset spacer 22 is illustrated in FIGS. 9–10 and includes a pivot bore 96 and a pair of detent bores 98, all of which are disposed along the longitudinal axis 100 of the spacer 22, with the pivot bore 96 being offset from the center of the spacer 22. The backset spacer 22 is coupled to the latch guide 16, as illustrated in FIG. 9, by a pivot bolt 112. Preferably, the pivot bolt 112 includes an unthreaded upper portion 114 that fits in the pivot bore 96 and a threaded lower portion 116 that screws into a receiving bore 97 in the latch guide 16. The detent bores 98 are equally spaced from the pivot bore 96 and are configured to align with slightly larger detent bores 120 in the latch guide 16 to provide a conventional spring-and-ball detent mechanism.

When the spacer 22 is in a first position, as illustrated in FIG. 1, the offset of the pivot bore 96, the distance from the first end 22*a* of the spacer 22 to the center of the hole saw-receiving aperture 18 provides a 2⅜ inch backset. When the spacer 22 is rotated 180 degrees, the distance from the second end 22*b* of the spacer 22 to the center of the hole saw-receiving aperture 18 provides a 2¾ inch backset.

Preferably, the pivot bore offset provides a first distance 124 from the center of the pivot bore 96 to a first end of the spacer of 1⅜ inches and a second distance 126 from the center of the pivot bore 96 to a second end of the spacer of 1¾ inches. However, it will be understood that any number of distances will work to provide the desired backsets, depending on the length of the spacer 22, the position of the pivot bore 96, and pivot bolt 112.

The installation jig 10 includes a plurality of drill bits for boring holes. With the exception of the working heads for hole saws, multi-spur bits, and spade bits, the drill bits are substantially similar in construction. Accordingly, the following discussion will describe a hole saw assembly 114, but it should be understood that the description applies to all of the drill bits of the installation jig 10.

Figure 11:
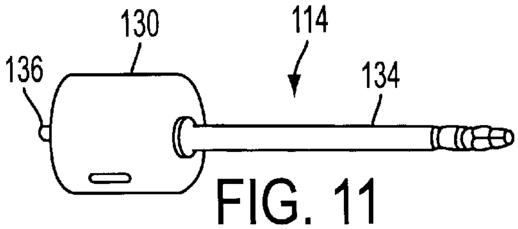
FIG. 11 is perspective view of a hole saw assembly.
Figure 12:
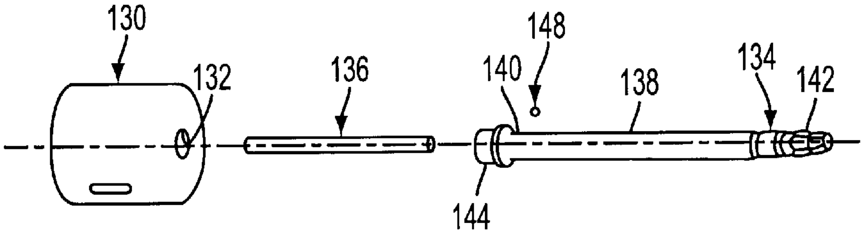
FIG. 12 is an exploded perspective view of the hole saw assembly of FIG. 11.
Figure 13:
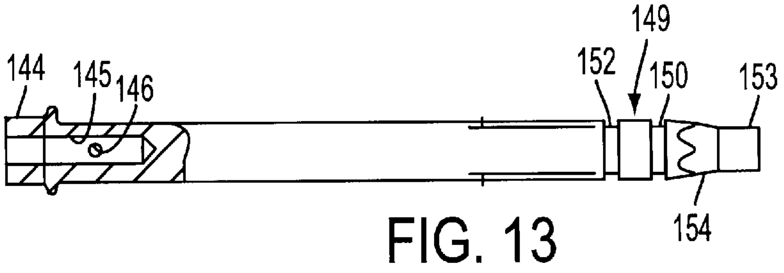
FIG. 13 is a partial section view of a mandrel for use in the hole saw assembly of FIG. 11.
Figure 14:
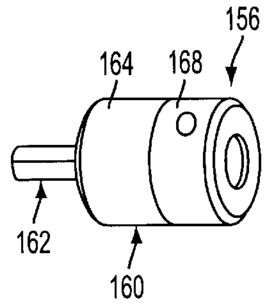
FIG. 14 is a perspective view of a drill bit adapter for use with the installation jig of FIG. 1.
Figure 15:
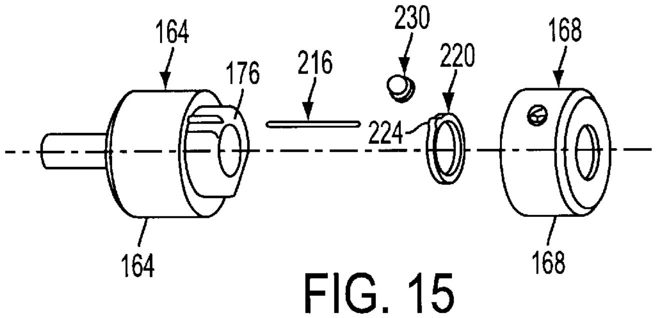
FIG. 15 is an exploded view of the drill bit adapter of FIG. 14.

A hole saw assembly 114 for use with the installation jig 10 is illustrated in FIGS. 11–13. The saw assembly 114 includes a mandrel 134, a drill bit 136, and a circular saw blade 130 with a threaded central bore 132. The mandrel 134 includes a shaft 138 having a first end 140 and a second end 142. The first end 140 includes an externally threaded portion 144, an axial bore 145 extending partially along the longitudinal axis of the shaft 138, and a transverse bore 146 that intersects the axial bore 145. The axial bore 145 receives the drill bit 136 and the transverse bore 146 receives a set screw 148 for retaining the drill bit 136 in the axial bore 145. The threaded portion 144 receives the threaded central bore 132 of the circular saw blade 130. The second end 142 of the shaft 138 includes a first portion 149 having a circular cross section and first and second annular grooves 150, 152, respectively, and a tip portion 153 having a hexagonal cross section. A tapered transition portion 154 joins the first portion 149 and the tip portion 153. In addition to the hole saw assembly 114, the installation jig 10 uses a variety of drill bits, including multi-spur bits and a spade bit. All of the bits include a shaft that is substantially identical to shaft 138, including the first and second grooves 150, 152 and the tapering tip portion 153. Preferably, a snap ring 155 (FIG. 23) is installed in the second groove 152 of each shaft 138.

Figure 16:
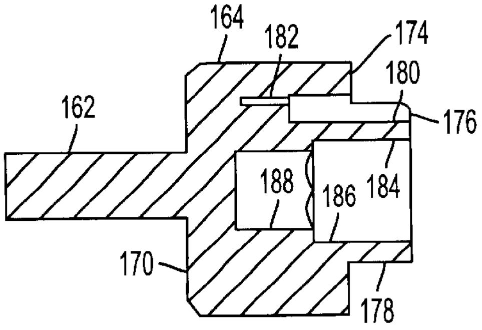
FIG. 16 is a section view through the body of the drill bit adapter of FIG. 14.
Figure 17:
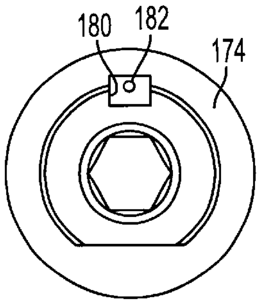
FIG. 17 is a top plan view of the body.
Figure 18:
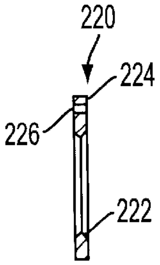
FIG. 18 is a section view through an adapter catch for use with the adapter of FIG. 14.
Figure 19:
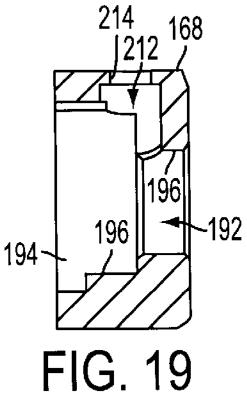
FIG. 19 is a section view through the cap of the adapter of FIG. 14.
Figure 20:
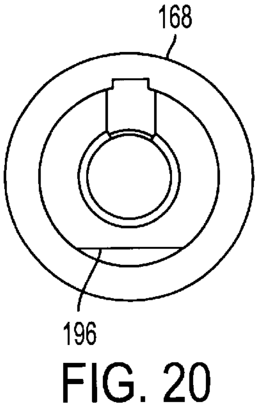
FIG. 20 is a bottom plan view of the cap.

A drill bit adapter 156, illustrated in FIGS. 14–21, couples the hole saw assembly 114, or a drill bit or multispur bit or the like, to a power tool, such as a drill. The adapter 156 includes a bit-receiving portion 160 and a shank 162 extending axially from the bit-receiving portion 160 for engaging a conventional chuck of a power tool. The bit-receiving portion 160 includes a body 164 and a cap 168. The body 164 includes a bottom surface 170, from which the shank 162 extends, and an upper surface 174. A generally cylindrical projection 176 extends axially from the upper surface 174 and includes a flat 178 and a channel 180 extending parallel to, and spaced-apart from, the longitudinal axis of the adapter 156. The channel 180 extends along the length of the cylindrical projection 176 and partially into the body 164. A small diameter bore 182 extends axially from the end of the channel 180 into the body 164. The small diameter bore 182 is offset radially outwardly from the center of the channel 180, as illustrated in FIGS. 16–17. A central bore 184 extends axially through the cylindrical projection 176 and partially through the body 164. The central bore 184 includes a first bore portion 186 with a circular cross section and second bore portion 188 with a hexagonal cross section. The first bore portion 186 is configured to receive the first portion 149 of the saw assembly shaft 138, and the second bore portion 188 is configured to receive the tip portion 153 of the shaft 138.

The cap 168 includes a central bore 192 extending therethrough. The central bore 192 includes body-receiving portion 194 and a shaft-receiving portion 196. The shaft-receiving portion 196 has a diameter slightly larger than the diameter of the shaft 138. The body-receiving portion 194 has a diameter substantially equal to the diameter of the cylindrical projection 176 and includes a flat 196 configured to abut the flat 178 of the cylindrical projection 176 to ensure proper alignment of the cap 168 on the body 164. The depth of the body-receiving portion 194 is greater than the height of the cylindrical projection 176, thus providing an annular catch-receiving cavity 198 (FIG. 21) when the body 164 and cap 168 are assembled. A button-receiving bore 212 extends transversely from the outside wall of the cap 168 to the central bore 192 and intersects both the body-receiving portion 194 and the shaft-receiving portion 196. The button-receiving bore 212 includes an inwardly extending annular shoulder 214 at the outside wall of the cap 168.

The adapter 156 also includes a wire spring 216 and an annular catch 220. The wire spring 216 is an elongated resilient member configured to fit in the small diameter bore 182 and be disposed in the channel 180. Since the small diameter bore 182 is offset from the center of the channel 180, the wire spring 216 is free to bend in the channel 180 toward the center of the adapter 156. The catch 220 is essentially a beveled washer with a beveled surface 222 and a projection 224 extending radially outwardly therefrom. The projection 224 includes a small aperture 226 for receiving the wire spring 216. The diameter of the central aperture of the catch 220 is substantially equal to the diameter of the central bore 192. The adapter 156 further includes a push button 230 to be operatively positioned in the button-receiving bore 212. The push button 230 includes a flange 232 that operatively abuts the annular shoulder 214 of the button-receiving bore 212 to retain the push button 230 in the bore 212.

Figure 21:
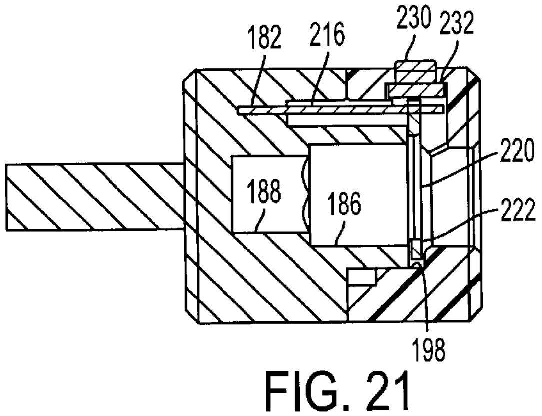
FIG. 21 is a section view through the assembled adapter of FIG. 14.

As illustrated in FIG. 21, when the adapter 156 is assembled, the wire spring 216 extends from the small diameter bore 182 through the aperture 226 in the catch 220. The catch 220 is disposed in the annular catch-receiving cavity 198 with the beveled surface 222 facing away from the body 164 of the adapter 156. The projection 224 on the catch 220 abuts the push button 230, which is disposed in the button-receiving bore 212.

In operation, the shaft 138 of the hole saw assembly 114, or a drill bit or multispur bit or the like, is inserted in the central bore 192. During insertion, the tapered transition portion 154 moves the catch 220 to align the central aperture of the catch 220 with the central bore 192 of the cap 168. As the tip portion 153 becomes fully seated in the hexagonal second bore portion 188, the catch 220 enters the first groove 150 under the biasing force of the wire spring 216 to retain the shaft 138 in the adapter 156. Because of the spacing between the first and second grooves 150, 152, the second groove 152 is operatively disposed outside of the adapter 156. To release the shaft 138, the operator presses the push button 230 against the biasing force of the wire spring 216 to move the catch 220 to align the central aperture of the catch 220 with the central bore 192 and out of the groove 150. When the catch 220 is out of the groove 150, the shaft 138 is free to be removed from the adapter.

Figure 22:
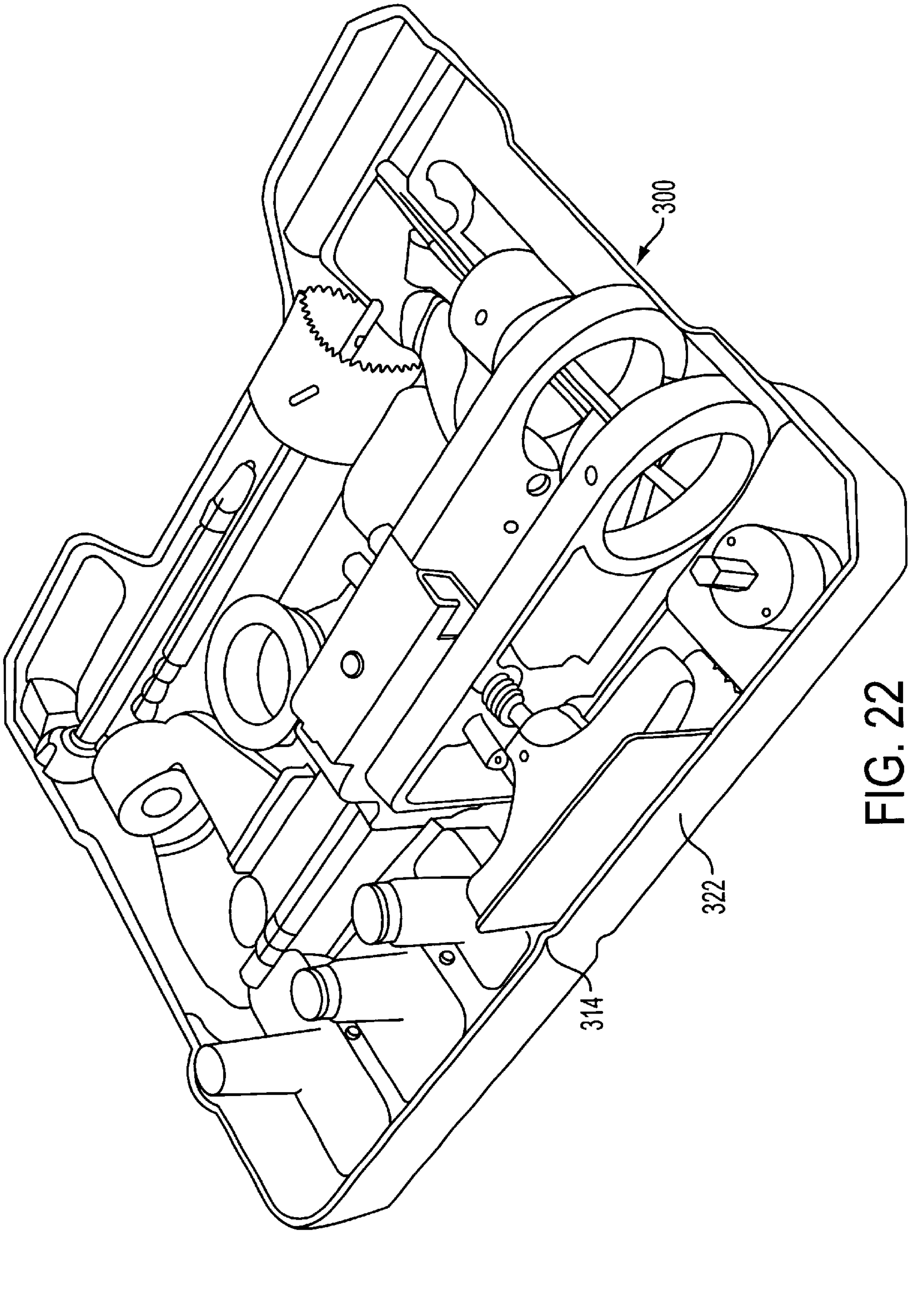
FIG. 22 is a perspective view of a kit including the installation jig of FIG. 1.
Figure 23:
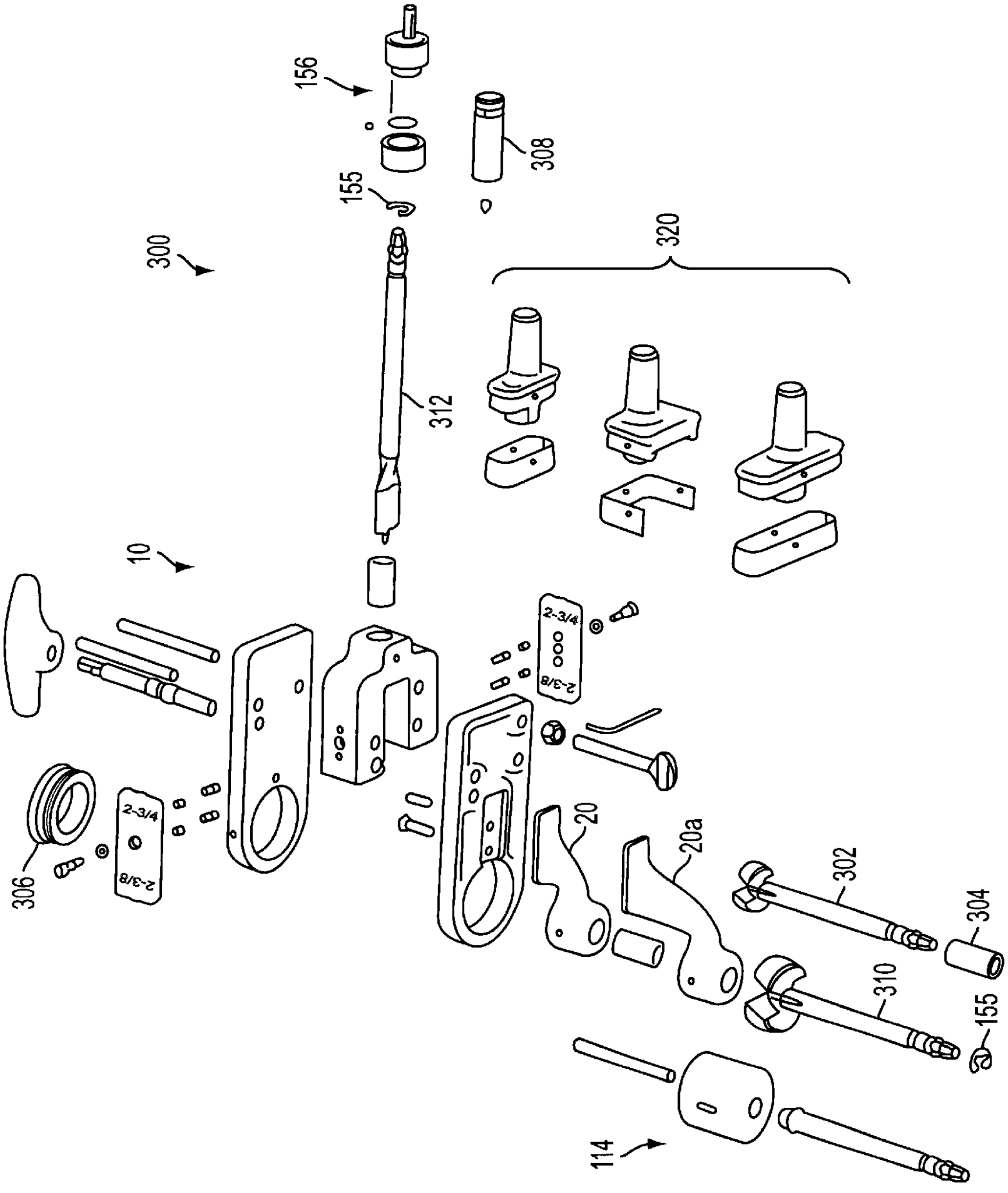
FIG. 23 is an exploded view of the kit.

Preferably, the installation jig 10 of the present invention would be marketed as a part of a kit 300 containing, as illustrated in FIGS. 22–23, the jig 10, a 1½ inch multi-spur bit 302 with a depth stop guide 304 and a 1½ inch ring adapter 306 (for 1½ inch standard door prep), a strike locator 308, in-line arms 20, 20*a* for wood doors and for metal doors, a 2⅛ inch multi-spur bit 310 for wood doors, a 2⅛ inch hole saw 114 for metal and/or fiberglass doors, a 1-inch spade bit 312, a template measurement guide 314, a drill bit adapter 156, and a plurality of mortising tools 320. In addition, the various pieces of the kit would fit in molded recesses of a carrying case 322 designed for the purpose.

In preferred embodiments, the installation jig is pre-assembled with the first in-line arm 20 attached to the first jaw 12 and with the 2⅛ inch multi-spur bit mounted in the drill guide bore 76. In addition, the 1-inch spade bit is mounted in the latch guide 16. Each bit includes a snap ring 155 installed in the second groove 152 of the bit shaft 138. The snap ring 155 cooperates with the tool head to retain the drill bit its respective bore. With this configuration, the installation jig would be ready for a standard 2⅛ inch door prep.

To proceed with the standard 2⅛ inch door prep, the installer would measure and mark the location for the lockset, rotate the backset spacer to the desired backset, and mount the jig 10 in position on the door. The installer would mount the drill bit adapter 156 in the chuck of a drill and then sequentially insert the spade bit and the multi-spur bit in the drill bit adapter 156 and proceed to drill the necessary latch and lockset holes in the door.

If the installer wants to perform a standard 1½ inch door prep, the installer would remove the 2⅛ inch multi-spur bit by removing the snap ring from the shaft of the 2⅛ inch bit and pull the shaft through the guide bore 76 in the in-line arm 20. Likewise, the installer would remove the snap ring from the shaft of the 1½ inch bit, mount the 1½ inch bit in the guide bore 76, and remount the snap ring on the 1½ inch bit. In addition, the installer would insert the 1½ inch ring adapter in the second jaw 14 and retain it in place with a set screw 157. The installer would then set the backset spacer, mount the jig 10 on the door and proceed with the door prep as described.

In the event that the installer wants to perform a standard 2⅛ inch door prep on a metal or fiberglass door, the installer would remove the retaining screw 94 and remove the first in-line arm 20. The installer would remove the snap ring from the second groove 152 of the hole saw assembly 114, insert the hole saw assembly shaft 138 into the drill guide bore 76 in the second in-line arm 20*a* and reinstall the snap ring in the second groove 152. The installer would position the second in-line arm 20*a* in the recess 86 and install the retaining screw 94. With the hole saw assembly 114 mounted on the jig 10, the installer would set the backset, mount the jig 10 on the door and proceed with the door prep as described.

The present invention has been described with respect to a presently preferred embodiment. However, it will be understood that various modifications can be made within the scope of the invention as claimed below.

What is claimed is:

1. A drill bit adapter comprising:

a body portion having a longitudinal axis and a central projection;

a cap portion having a central aperture for receiving the central projection;

a push button disposed in, and movable relative to, the cap portion; and a biased catch disposed adjacent the push button, the catch being movable transversely to the longitudinal axis between a locking position and a releasing position.

2. The adapter of claim 1 wherein the biased catch includes an annular member and a spring coupled to the annular member.

3. The adapter of claim 2 wherein the spring includes a resilient member extending from the body portion to the cap portion.

4. The adapter of claim 1 wherein the biased catch includes an annular member having a projection extending radially outwardly therefrom and a spring disposed in the body and extending parallel to the longitudinal axis to engage the projection.

5. A drill bit adapter comprising:

a body portion having a longitudinal axis and an aperture transverse to the longitudinal axis;

a cap portion coupled to the body portion;

a cantilevered spring disposed in the body portion and extending longitudinally into the cap portion;

a catch coupled to the spring for movement transverse to the longitudinal axis; and an actuator disposed in the transverse aperture and coupled to the catch.

6. The adapter of claim 5 wherein the catch is disposed between the body portion and the cap portion.

7. The adapter of claim 6 wherein the catch includes a projection extending radially outwardly therefrom and the spring is coupled to the projection.

8. The adapter of claim 5 wherein the actuator is disposed in the cap portion.

9. The adapter of claim 5 wherein catch includes an annular member disposed between the body portion and the cap portion and the actuator is disposed in the cap portion and the spring extends from the body portion to engage the annular member.

10. A drill bit adapter comprising:

a body portion having a central projection with a distal end;

a cap portion having a central aperture for receiving the central projection, the distal end being separated from the cap portion to define a cavity adjacent the distal end;

a catch disposed in the cavity;

a push button disposed adjacent the catch;

a spring for biasing the catch in a direction transverse to a longitudinal axis of the body portion toward a locking position.

11. The adapter of claim 10 wherein the spring includes a wire extending from the body portion into the cavity.

12. The adapter of claim 10 wherein the spring is disposed in the body portion and extends parallel to a longitudinal axis of the adapter.

13. The adapter of claim 10 wherein the push button is disposed in the cap portion.

14. A drill bit adapter comprising:

a body having a longitudinal axis, a longitudinal aperture and an aperture transverse to the longitudinal axis;

a resilient member disposed in the body and extending parallel to the longitudinal aperture;

a catch disposed in the body for movement transverse to the longitudinal axis, the resilient member being coupled to the catch to bias the catch toward a locking position; and an actuator disposed in the transverse aperture.

15. The adapter of claim 14 wherein the catch includes an annular member having a radially extending projection and the resilient member includes a wire spring coupled to the projection.

16. The adapter of claim 14 wherein the body further includes a cavity for receiving the catch, the cavity opening into the longitudinal aperture and the transverse aperture.

* * * * *